United States Patent
Vidal Rudloff et al.

(10) Patent No.: US 8,210,125 B2
(45) Date of Patent: Jul. 3, 2012

(54) AQUACULTURE NET WITH DIFFERENT DENSITIES OF WEIGHT

(75) Inventors: Guillermo Alejandro Vidal Rudloff, Talcahuano (CL); Hector Paredes Montecinos, Talcahuano (CL)

(73) Assignee: NV Bekaert SA, Zwevegem (BE)

( * ) Notice: Subject to any disclaimer, the term of this patent is extended or adjusted under 35 U.S.C. 154(b) by 68 days.

(21) Appl. No.: 12/863,110

(22) PCT Filed: Dec. 11, 2008

(86) PCT No.: PCT/EP2008/067325
§ 371 (c)(1),
(2), (4) Date: Jul. 15, 2010

(87) PCT Pub. No.: WO2009/089971
PCT Pub. Date: Jul. 23, 2009

(65) Prior Publication Data
US 2011/0048331 A1    Mar. 3, 2011

(30) Foreign Application Priority Data
Jan. 18, 2008   (EP) .................................... 08150401

(51) Int. Cl.
*A01K 71/00* (2006.01)
*A01K 61/00* (2006.01)

(52) U.S. Cl. .............................................. 119/223; 43/7
(58) Field of Classification Search ................... 119/216, 119/223, 226, 228; 43/7, 9.1, 9.2, 9.3, 9.8, 43/9.95
See application file for complete search history.

(56) References Cited

U.S. PATENT DOCUMENTS
5,967,086 A * 10/1999 Knott, Sr. ........................ 119/223
2010/0319625 A1    12/2010 Vidal Rudloff FOREIGN PATENT DOCUMENTS
| JP | 2000308432 A | * 11/2000 |
| JP | 2001-190178 A | 7/2001 |
| JP | 2001190179 A | * 7/2001 |
| JP | 2004-305174 A | 11/2004 |
| WO | WO 2006/137128 A1 | 12/2006 |

OTHER PUBLICATIONS

English-language translation of JP 2000-308432.*
English-language translation of JP 2001-190179.*

* cited by examiner

*Primary Examiner* — Rob Swiatek
*Assistant Examiner* — Lisa Tsang
(74) *Attorney, Agent, or Firm* — Foley & Lardner LLP

(57) ABSTRACT

The invention relates to an aquaculture net (30) comprising wires (32, 34, 36) of lighter weight or smaller diameter towards the bottom of the net. The advantage is an aquaculture net with a prolonged life time.

10 Claims, 2 Drawing Sheets

AQUACULTURE NET WITH DIFFERENT DENSITIES OF WEIGHT

TECHNICAL FIELD

The invention relates to an aquaculture net with a prolonged life time.

BACKGROUND ART

Aquaculture nets or fish-farming nets are used to raise aquatic life such as fish. The aquaculture net keeps the aquatic life controlled and contained and protects the aquatic life inside the net against predators such as sharks and sea wolfs.

The dimensions of such an aquaculture net are considerable. An example of a typical dimension is 30 m×30 m×15 m, the last dimension being the depth of the net inside the water and the first two dimensions being the width and length of the net at the water surface. The net may be formed of a polymer wire or of a coated steel wire. As a matter of example only, a net made of galvanized steel wire and of the above-mentioned dimensions has a weight above 4 metric Tonnes.

The aquaculture nets are usually of the chain-link fence type. This is a fence of steel wires woven into a diamond pattern. The meshes have a dimension that is smaller than the dimension of the fish contained in the nets. Each steel wire is preformed by bending so that it exhibits a wavy pattern with maxima and minima. The maxima of a steel wire interlock with the minima of a neighbouring wire to form the patterns of a series of diamonds.

Aquaculture nets of the chain-link fence type have proven to be successful to control the aquatic life and to protect against predators. Aquaculture nets with galvanized steel wires offer an acceptable resistance against bio-fouling, i.e. against fouling material that may grow on the mesh structure. Within the context of the present invention, the terms fouling material refer to fouling organisms such as barnacles, algae or molluscs, which may attach and grow to the wire material of the mesh structure. This fouling mechanism is so persistent that entire openings in the meshes may be filled blocking any introduction of fresh water or nutrition into the volume inside the mesh structure.

Experience has shown, however, that aquaculture nets of the chain-link fence type also have some disadvantages. Aquaculture nets have been discovered where one or more of the steel wires was broken after a limited life time. Besides the forces created by movement within the water, this is also due to the enormous own weight of the nets.

DISCLOSURE OF INVENTION

It is an object of the invention to avoid the disadvantages of the prior art.

It is a further object of the invention to provide an aquaculture net having a lower weight.

It is also an object of the invention to provide an aquaculture net with a prolonged life time.

Investigation of the failing aquaculture nets revealed that particularly the upper steel wires in the aquaculture net were broken. Indeed, the ocean or the sea forms a huge challenge with respect to corrosion resistance. In addition to this highly corroding environment, the waves and tidings subject the aquaculture net to a continuous and repeated movement. Furthermore, in an aquaculture net of the chain-link fence type, each steel wire must carry the weight of the rest of the net below it.

The solution provided by the present invention is based on the following principle. The lower the part within the net, the less weight of the rest of the net below it has to carry, the less strong this part of the net must be. This can be realized by giving the lower parts of the net a density of weight that is lower than the density of weight of the upper parts of the net. This enforced effect results in an overall weight reduction of the entire net.

According to a first aspect of the present invention is provided an aquaculture net which is divided into at least two parts, a lower part and an upper part. The lower part has a density of weight that is lower than the density of weight of the upper part thus resulting in a difference in density of weight. The bottom or lower part of the net is defined as that part of the net deepest in the water; the top or upper part of the net is that part of the net closest to the water level.

The difference in density of weight can be realized in various ways.

In a first way the lower parts of the net may have openings which are greater than the openings in the upper parts of the net, although still being smaller than the dimensions of the fish.

In a second way the lower parts of the net may have wires which have a smaller weight than the weight of the wires in the upper parts.

In a specific embodiment the wire is lighter in weight due to a smaller diameter of the wire. As such an aquaculture net is provided wherein the diameter of said wires are smaller towards the bottom of the net than those at the top of the net.

The aquaculture net may be a chain-link fence.

The aquaculture net is preferably divided into sections having steel wires of lighter weight for sections arranged more towards the bottom of the net. The sections are preferably arranged horizontally, i.e. parallel to the water level.

In a preferred embodiment the aquaculture net comprises three parts. These parts are arranged horizontally. There is a lower part, an intermediate part and an upper part. The lower part has a density of weight that is lower than the density of weight of the intermediate part. The intermediate part has a density of weight that is lower than the density of weight of the upper part.

In a specific embodiment the wires are steel wires.

The steel wires usually have a wire diameter that is smaller than 3.0 mm.

In the three-part embodiment, the lower part may have steel wires with a diameter smaller than 1.80 mm. The intermediate part may have steel wires with a diameter ranging from 1.70 mm to 2.0 mm. The upper part may have steel wires with a diameter greater than 1.90 mm.

In one embodiment the parts or sections all have the same size or height. In another embodiment, the parts may have a different size or height. In one embodiment the height of the lower parts may be greater than the height of the parts above, hereby reducing the weight of the lower parts. In another embodiment the height of the upper parts may be greater than that of the parts below it, hereby increasing the strength of the upper parts or their ability to carry more weight.

The invention works for many embodiments by combining the diameter of the wire with the height of a part or section to define a weight per section.

As such, the aquaculture net according to the invention preferably has the shape of a square or rectangular box, but may also be shaped as a cone, as a sphere, or any other shape, comprising sections of different diameter of the wire and different height of the parts or sections. In one embodiment said aquaculture net has dimensions which are greater than 1 m×1 m×1 m (length×width×depth).

BRIEF DESCRIPTION OF FIGURES IN THE DRAWINGS

FIGS. 1 and 2 each show an upper view of an installed aquaculture net (floating support).

MODE(S) FOR CARRYING OUT THE INVENTION

The net can be made of a polymer, such as polyethylene, polyester or polyamide. The net is preferably made of a chain-link fence of metal wires, e.g. steel wires where the steel wires are provided with a corrosion-resistant coating and/or an antifouling coating. Other suited metal wires are made of copper alloy or titanium.

Figure 1:
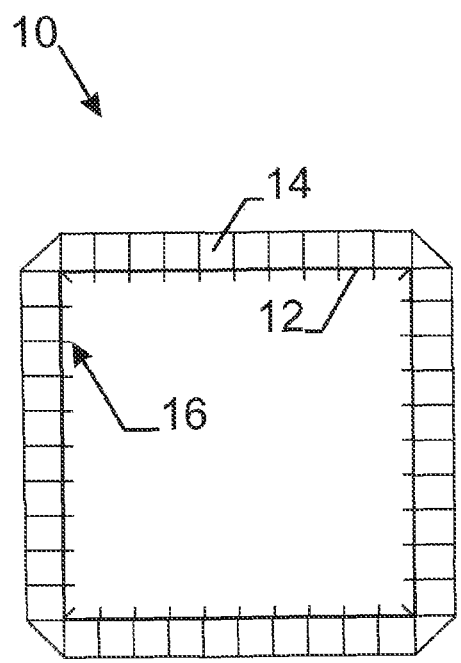

FIG. 1 illustrates a square embodiment of a raft 10 for an aquaculture net as described by the present invention. The raft 10 comprises various galvanized steel bars 12 supported by HDPE floating devices 16. A platform 14 is connected thereto. People can walk around on the platform 14. The aquaculture net can be directly connected to the steel bars 12 by means of ropes or wires.

Figure 2:
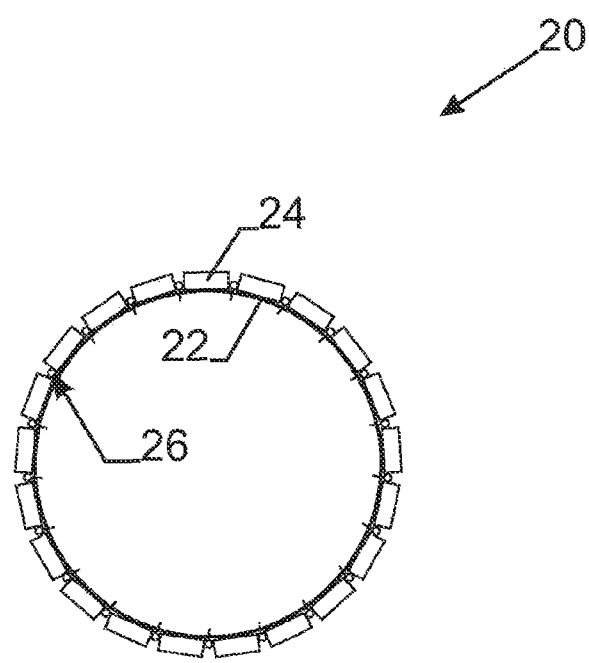

FIG. 2 illustrates a circular embodiment 22 of a raft 20 for an aquaculture net as described by the present invention. A circular raft may be made from HDPE tubes 26 connected to one another by means of brackets. A platform 24 is connected thereto. The aquaculture net can be suspended directly at the raft. The bottom of the aquaculture net may still have the shape of a rectangle or square whereby the upper side takes a form close to a circle (more precisely, the form of a polygon).

Figure 3:
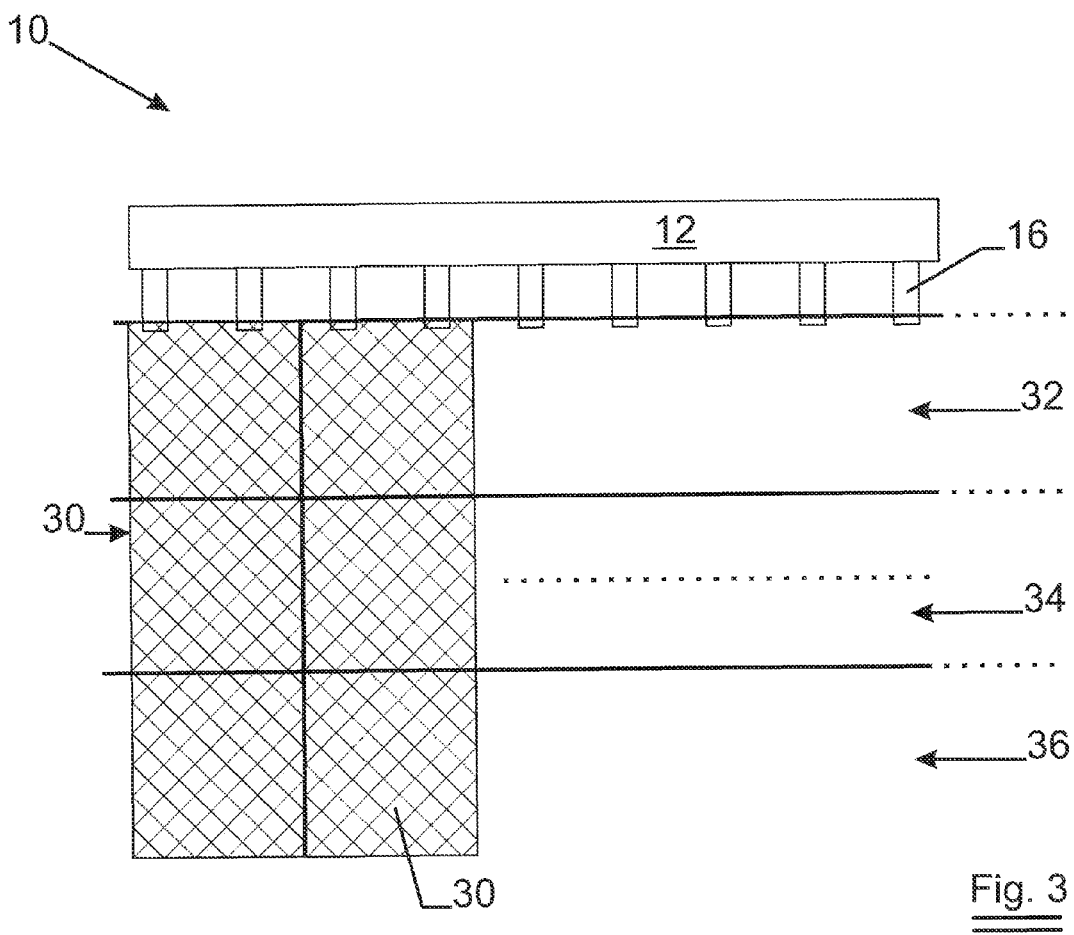
FIG. 3 shows a side view of an installed aquaculture net according to the present invention.

FIG. 3 illustrates a side view of an embodiment of an installed aquaculture net 30 according to the present invention. The floating support 10 is of the square type as illustrated in FIG. 1. The aquaculture net 30 is connected to the tubes 16 by means wires or ropes (not shown). The net comprises three sections each having a wire of different diameter. The upper or top section 32 has a wire with a diameter of about 2.10 mm; the wire of the middle or intermediate section 34 has a diameter of about 1.80 mm; the wire of the lower or bottom section, deepest in the water, has a diameter of about 1.60 mm. In this embodiment the height of the three sections 32, 34 and 36 is the same. Compared to an aquaculture net having wires of the same diameter, this means e.g. that section 36 is lighter in weight to be carried by section 34; or also that section 34 may have a smaller diameter than usual to carry the lighter section 36. The same goes for sections 32 and 34. The various sections 32, 34, 36 can be connected to one another in various ways, e.g. means of a spiralling steel wire going through the side openings of the neighbouring sections, e.g. by means of a metal rope going through the side openings of the neighbouring sections or e.g. by means of pieces of binding wire. Alternatively, the various sections do not form separate parts but are part of one continuous woven chain link fence.

Figure 4:
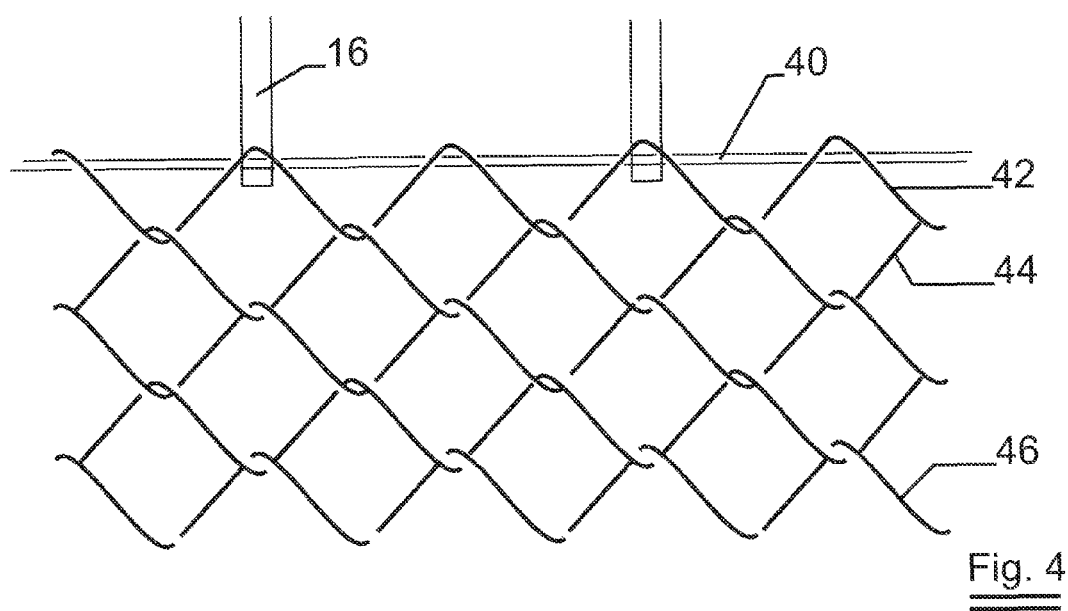
FIG. 4 shows a side view of a chain-link fence aquaculture net according to the present invention.

FIG. 4 shows an alternative embodiment of a side view of a chain-link fence aquaculture net 40 according to the present invention. The aquaculture net 40 is directly connected to the tubes 16. In this alternative embodiment, the first top wire 42 of the chain-link fence is made of the largest diameter to be able to carry most weight and to strengthen the attachment to the floating raft. The wires 44 and below have a smaller diameter. Yet more to the bottom of the net, the wires 46 have a yet smaller diameter. This may be repeated for wires below such that they have a further smaller diameter than the wires above.

The invention claimed is:

1. An aquaculture net, comprising:
 a lower part;
 an intermediate part; and
 an upper part,
 wherein the lower, intermediate, and upper parts are arranged horizontally,
 wherein the lower part has a first density of weight, the intermediate part has a second density of weight, and the upper part has a third density of weight, and
 wherein the first density of weight is lower than the second density of weight and the second density of weight is lower than the third density of weight.

2. The aquaculture net according to claim 1, wherein the lower, intermediate, and upper parts are formed by wires, and wherein the first density of weight being lower than the second density of weight is realized by the wires forming the lower part having a smaller weight than the wires forming the intermediate part, and wherein the second density of weight being lower than the third density of weight is realized by the wires forming the intermediate part having a smaller weight than the wires forming the upper part.

3. The aquaculture net according to claim 2, wherein the wires forming the lower part have a first diameter, the wires forming the intermediate part have a second diameter, and the wires forming the upper part have a third diameter, and wherein the first diameter is smaller than the second diameter, and the second diameter is smaller than the third diameter.

4. The aquaculture net according to claim 1, wherein said aquaculture net is a chain-link fence.

5. The aquaculture net according to claim 2, wherein said wires forming the lower part, the intermediate part, and the upper part are steel wires.

6. The aquaculture net according to claim 5, wherein said steel wires are provided with a corrosion resistant coating, an antifouling coating, or a combination thereof.

7. The aquaculture net according to claim 5, wherein said steel wires forming the lower, intermediate, and upper parts have a wire diameter that is smaller than 3.0 millimeters.

8. The aquaculture net according to claim 3, wherein the wires forming the lower, intermediate, and upper parts are steel wires, wherein the first diameter is smaller than 1.80 millimeters, wherein the second diameter ranges from 1.70 millimeters to 2.0 millimeters, and wherein the third diameter is greater than 1.90 millimeters.

9. The aquaculture net according to claim 1, wherein said aquaculture net has dimensions which are greater than 1 meter x 1 meter x 1 meter.

10. The aquaculture net according to claim 2, wherein the wires forming the lower, intermediate, and upper parts are made of copper alloy.

* * * * *